Patented Oct. 1, 1940

2,216,262

UNITED STATES PATENT OFFICE 2,216,262

MANUFACTURE OF CATALYSTS

Herman S. Bloch and Charles L. Thomas, Chicago, Ill., assignors to Universal Oil Products Company, Chicago, Ill., a corporation of Delaware No Drawing. Application October 30, 1937, Serial No. 172,057

2 Claims. (Cl. 23—233)

This invention relates more particularly to the manufacture of catalysts suitable for accelerating reactions among hydrocarbons.

More specifically it has reference to a method for manufacturing granular refractory catalytic materials which are particularly effective in selectively promoting the formation of gasoline boiling range liquids from relatively heavy petroleum fractions.

The art of cracking relatively heavy hydrocarbons to produce primarily gasoline or gas is very extensive and it is recognized that most of the basic principles of hydrocarbon decomposition are known and that particular commercial processes have been developed which embody these principles. The application of catalysts, however, in cracking reactions is practically upon the same basis as it is in other fields, that is, there is much more to be learned about them. A large number of the catalysts developed for cracking have a tendency to accelerate reactions leading to the formation of gas rather than of gasoline, this being particularly evidenced by reduced metal catalysts such as nickel or iron and many of such catalysts are sensitive to sulfur poisoning and are quickly coated with carbonaceous materials which render them practically inert. This decomposition of carbonaceous materials is many times related to the type of decomposition reactions selectively fostered by the catalyst.

The present invention is concerned with the manufacture of catalytic materials which are specially adapted to accelerate the cracking of heavy distillate fractions of petroleum and other hydrocarbonaceous materials to increase the rate of production of high antiknock gasoline-boiling range fractions and gaseous by-products which contain unusually high percentages of readily polymerizable olefins which are a potential source of further gasoline yields. The catalysts are characterized by selectivity in accelerating gasoline-forming reactions rather than light gas-forming reactions, by their selectivity in producing high antiknock gasoline, by their refractory character which enables them to retain their catalytic properties under severe conditions of temperature and pressure, by their ease and simplicity of manufacture and their exact reproducibility.

In one specific embodiment the present invention comprises a process for manufacturing catalysts suitable for converting hydrocarbon distillate fractions containing substantially no gasoline into material yields of gasoline and gases containing relatively high percentages of polymerizable olefins by depositing minor amounts of silica on alumina.

According to the present invention it has been found that catalysts possessing a high activity and selectivity in producing gasoline and polymerizable olefins from hydrocarbon distillates are producible by depositing silica upon a relatively pure salt-free alumina gel, followed by washing to remove soluble salts and drying to remove the major portion of combined or adsorbed water. In the catalysts thus prepared the ratio of alumina to silica by weight is usually greater than 10:1, active catalysts having been prepared in which the ratio is as high as 25:1 so that in effect the silica acts as a promoter of the catalytic activity of the alumina in cracking reactions. It is to be recognized that very little is known positively concerning the mechanism of promoter action in catalysis and attempt will be made herein to offer any definite reasons for the observed effect of the addition of small amounts of silica to alumina. There may be a joint promoter effect or it may be that the silica is the more active catalyst and is extremely dispersed in and on the alumina in order to present a large surface.

In making up the catalysts it is preferable to employ gels of both alumina and silica which have been prepared by controlled precipitation from aqueous solutions of their salts and washed substantially free from adhering soluble materials. In the preparation of the aluminum hydroxide gel, ammonium compounds such as the hydroxide, the carbonate or the sulfide, give the best result as precipitants and solutions of such salts as aluminum chloride or aluminum sulfate may be employed as a source of alumina. Washing may be done by the decantation method.

The most convenient and ordinary method of preparation of silica gel is to acidify an aqueous solution of sodium silicate by the addition of the required amount of hydrochloric acid. The excess of acid and the concentration of the solution in which the precipitation is brought about will determine the primary activity of the silica and its suitabilty for acting as a promoter for alumina to produce a composite catalyst of increased activity. In general the most active silica is produced by only slightly acidifying the sodium silicate, but the material formed at such a point is rather gelatinous and is filtered with difficulty. By using a moderate excess of acid, the more desirable physical characteristics in regard to catalytic activity are conserved while the "filtrability" is greatly improved. Fairly good hydrated silica for present catalytic purposes may be made by employing as high as a 20% excess of hydrochloric acid, but beyond this point the more desirable properties are lost.

After precipitating the silica gel to be used as a promoter for the alumina it is preferably washed until substantially free from salts and acid, and the required quantity is then added to an aqueous suspension of similarly purified aluminum hydroxide gel followed by thorough agitation and boiling of the suspension, filtering and drying first at about 300° F. to produce a material containing about 15% by weight of water which is readily ground and sized and then further drying under the approximate conditions of service, that is, at temperatures of from about 900–1000° F., which reduces the water content down to about 2–3% by weight of the catalyst particles and thus finally renders the material suitable for use in catalytic cracking.

Catalysts prepared by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that catalysts may be reactivated and reused for long periods of time.

Catalysts prepared by the general process of the present invention described in the preceding paragraphs are utilized to good advantage in cracking reactions when employed as filling material in tubes or chambers in the form of small pellets or granules. In the majority of cases wherein hydrocarbon fractions readily vaporizable at moderate temperatures without extensive decomposition are employed, the average particle size is within the range of 6–10 mesh, which may apply either to small pellets of uniform size and short cylindrical shape or to particles of irregular size and shape produced by the grinding and sizing of the partially dehydrated materials.

The general procedures in cracking involving the preheating of vapors to a cracking temperature before passing them over the catalyst and the subsequent fractionation steps involving separation of residuum and the further splitting up of the products into fixed gases, fractions of gasoline boiling range and heavier recycle stocks, may be obviously followed in the case of the catalysts comprised within the scope of the invention. In using these catalysts moderate temperatures, relatively low pressures and high throughputs are to be expected in comparison with the strictly thermal cracking processes in use at the present time. It is seldom necessary to employ temperatures over 950° F., pressures materially above atmospheric or times of contact over ten seconds.

The following example of preparation and use of the types of catalysts peculiar to the present invention is given to indicate their novelty and utility in practical cracking processes although not for the purpose of limiting the invention in exact agreement with the data introduced.

A catalyst for use in cracking according to the invention was prepared which consisted approximately of 98% $Al_2O_3$ and 2% $SiO_2$ (on dry basis) by boiling a precipitated and washed aluminum hydroxide with the required percentage of similarly pretreated silicic acid, allowing the mixture to set to a rather stiff gel and drying the gel at 300° F. The material at this point was ground and sized to produce particles of 6–10 mesh and these were further dried in place before the passage of the oil vapors undergoing treatment.

A Pennsylvania gas oil was vaporized and the vapors were preheated to a temperature of approximately 932° F., under a pressure slightly above atmospheric to permit flow through the bed of catalyst and the succeeding fractionating and recovery equipment. The preheated vapors were passed through the catalyst at a rate consistent with the production of best results in regard to yield and quality (particularly in regard to octane number) of the gasoline produced. The following tabulation shows the results obtained when using a prepared alumina with and without the addition of 2% of silica.

| | Run No. | |
|---|---|---|
| | 1 | 2 |
| Catalysts | $Al_2O_3$ | $Al_2O_3+2\%$ $SiO_2$ |
| 400° F. end-point gasoline: | | |
| Yield, vol. percent | 21.2 | 26.4 |
| Octane No. (motor method) | 66 | 72.0 |
| Engler distillation— | | |
| 25% over | 208 | 189 |
| 50% over | 275 | 270 |
| 75% over | 332 | 329 |
| Hempel bottoms, gravity, °A. P. I. | 38.4 | 37.6 |
| Gaseous product, wt. percent | 3.9 | 7.0 |
| Gaseous product, mol. wt. | 17.7 | 22.2 |
| Vol. percent $H_2$ | 44.6 | 36.8 |
| $CH_4$ | 15.0 | 16.9 |
| $C_2$ hydrocarbons | 9.6 | 23.1 |
| $C_3$ hydrocarbons | 19.3 | 15.9 |
| $C_4$ hydrocarbons | 11.5 | 7.3 |

It will be seen from the above data that the addition of a silica promoter to the aluminum catalyst gave a noticeable increase in the gasoline yield and also an increase in the octane number of this gasoline.

This application is related to our companion application Serial No. 172,056 filed of even date herewith.

We claim as our invention:

1. A process for producing catalysts which comprises suspending aluminum hydroxide gel in an aqueous medium, adding silica gel to the resultant suspension, then agitating and boiling the suspension and filtering to separate an alumina-silica composite, heating the latter at a temperature of the order of about 300° F. to effect partial drying thereof, forming the partially dehydrated composite into bodies of predetermined size, and heating said bodies at a temperature above 900° F. to remove additional water therefrom and form the final catalyst.

2. A process for producing catalysts which comprises acidifying a sodium silicate solution to precipitate a silica gel, washing the latter to free the same of salts and acid, separately precipitating an aluminum hydroxide gel from an aqueous aluminum salt solution and freeing this precipitated gel of soluble salts by washing thereof, suspending the aluminum hydroxide gel in an aqeous medium and adding said silica gel to the resultant suspension, then agitating and boiling the suspension and filtering to separate an alumina-silica composite, heating the latter at a temperature of the order of about 300° F. to effect partial drying thereof, forming the partially dehydrated composite into bodies of predetermined size, and heating said bodies at a temperature above 900° F. to remove additional water therefrom and form the final catalyst.

HERMAN S. BLOCH.
CHARLES L. THOMAS.